Patented Feb. 8, 1944

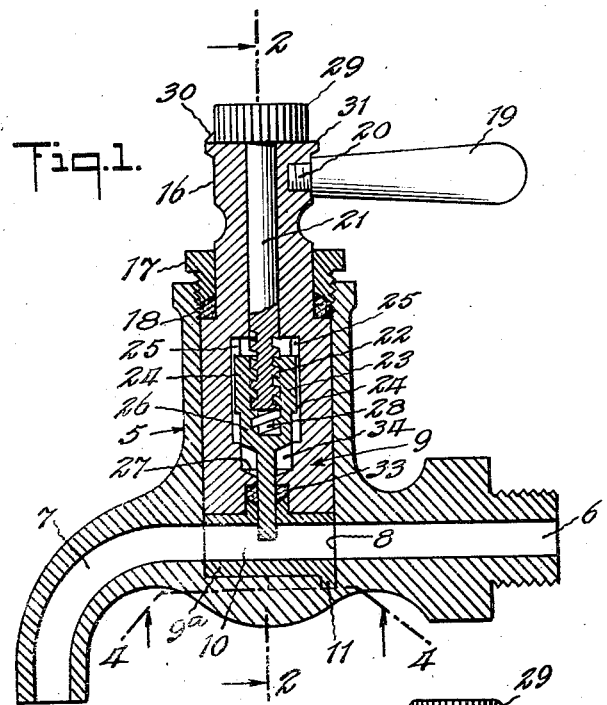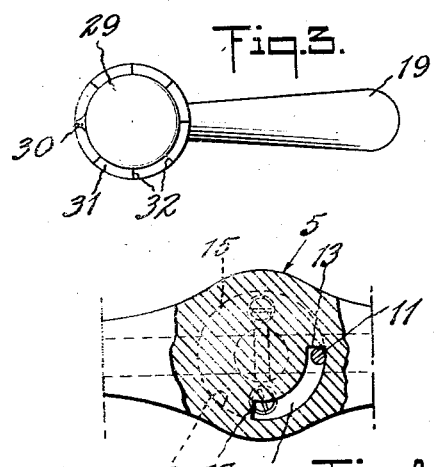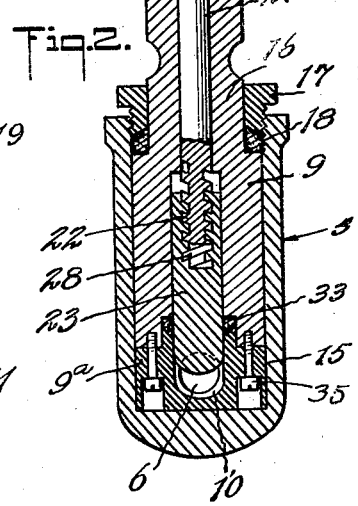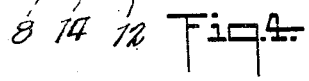
INVENTOR
EDMOND OJALVO
ATTORNEY

2,341,411

UNITED STATES PATENT OFFICE 2,341,411

COMPOUND VALVE

Edmond Ojalvo, New York, N. Y.

Application October 22, 1942, Serial No. 462,893

4 Claims. (Cl. 277—32)

This invention relates to a compound valve, particularly although not exclusively adapted for use with hot and cold water mixers.

It is a commonplace expedient to attach a conventional mixer to adjacent hot and cold water faucets for the purpose of obtaining water of a desired temperature. However, in the usual type of structures of this type, there is no adequate provision for rapidly obtaining a predetermined temperature of water, it generally being necessary to carefully regulate both the hot and cold water valves until the desired temperature is obtained. Where intermittent use of water is required, such as during shaving, it would accordingly be necessary to repeatedly regulate each valve. Rather than to go through this troublesome procedure, a person is often inclined to allow the water to run continuously for long periods of time, once a proper regulation has been effectuated—a procedure which obviously results in a considerable waste of water, as well as of fuel necessary to heat the water.

It is primarily within the contemplation of my invention to facilitate the regulation of hot and cold water valves whereby the aforesaid shortcomings of conventional structures will be eliminated. And in this aspect of my invention, it is an object to provide a valve provided with means for regulating the flow of water therethrough whereby, once a desired setting is established, the proper flow can be obtained by merely turning a main valve to a single open position. In this manner, all that need be done after the valve is once set, is merely to open it as far as it will go, whereupon the proper flow of water will course therethrough. It is thus apparent that by providing adjacent hot and cold water faucets with valve structures of my invention, a conventional mixer can be attached thereto to combine predetermined flows from both faucets and thereby produce a predetermined temperature.

It is within the further contemplation of my invention to provide a device of the above-mentioned category in a single unitary structure, thereby producing a simple, inexpensive and compact unit.

Other objects, features and advantages will appear from the drawing and the description hereinafter given.

Referring to the drawing,

Figure 1 is a vertical sectional view taken substantially along the axis of a form of valve of my invention.

Figure 2 is a section of Figure 1 taken along line 2—2 thereof.

Figure 3 is a plan view of the top portion of the structure of Figure 1, and

Figure 4 is a fragmentary section taken substantially along line 4—4 of Figure 1.

The drawing shows my invention as applied to a faucet although it may just as conveniently and effectively be employed in any other valve fitting. The casing 5 of the faucet illustrated contains an inlet 6 and an outlet or discharge conduit 7, both communicating with the main valve chamber 8. Rotatably disposed within said chamber is the main valve member 9 containing a transverse passage 10 adapted for registry and cooperative use with said inlet and outlet conduits 6 and 7. Said main valve 9 is provided at the lower portion thereof with a pin or extension 11 movable within the recessed portion 12, preferably at the lower portion of the casing 5—said recessed portion containing walls 13 and 14 serving as stops abuttable with the extension 11 for the purpose of limiting the operative movement of main valve 9. When the extension is in engagement with wall 13, the passageway 10 is in communication with conduits 6 and 7 to permit the passage of water therethrough; and when the said extension is in engagement with wall 14, said passageway is entirely out of communication with said conduits, the lateral wall 15 of the valve being disposed against the adjacent openings of conduits 6 and 7, respectively, to prevent the passage of water therethrough. It is preferred that walls 13 and 14 be 90° apart, so that the main valve 9 can be rotatably manipulated through an angle of 90° to full open and closed positions.

The upper portion 16 of the main valve constitutes the valve stem thereof, being in the form of a sleeve extending upwardly through the gland 17 secured to the body 5 of the faucet and holding the packing 18 in operative position to prevent leakage. Said upper portion 16 of the valve stem is joined to the handle 19 for manually manipulating the valve. In the form of construction illustrated, the valve stem has a threaded recess therein in threaded engagement with the stud 20 of the said handle.

Extending through the hollow stem 16 is an auxiliary stem 21 carrying, by means of the thread 22, an auxiliary valve 23 axially movable within main valve 9 and adapted to intercept the passageway 10 therein. The said auxiliary valve contains longitudinal ribs or extensions 24 slidably movable within grooved guides 25 within the main valve—the auxiliary valve further containing an enlarged portion 26 adapted for engagement with the auxiliary valve seat 27 on the main valve 9. The auxiliary valve also contains the threaded axial recess 28 in operative engagement with the threaded portion 22 of the auxiliary stem 21. The arrangement is such that upon a rotation of the auxiliary stem, the auxiliary valve 23 will be caused to move up or down within the main valve 9.

Attached to the upper portion of the auxiliary stem is the manually operable knob 29 containing a pointer 30 thereon, the underside of said knob being disposed over the upper flat surface 31 of the main valve stem 16. Upon said surface 31 are a series of markings 32 coactively associated with said pointer 30.

It is preferred that the knob 29 rest upon the surface 31 which will thereby serve as a support for the entire auxiliary valve assembly. The main valve, in the preferred form illustrated, is made of two sections, the lower section 9a being in effect a packing gland supporting a packing 33 against the auxiliary valve 23 to prevent a leakage of water therepast to the space 34 above the valve seat 27. The two sections of the main valve can be secured together in any suitable manner, such as by the threaded means 35.

In the operation of the form of my invention above-described, the main valve handle 19 is manipulated to turn the main valve 9 into its open position so that the passageway 10 is in direct communication between conduits 6 and 7, thereby permitting water to flow therethrough. Thereafter the regulating knob 29 is rotatably manipulated to cause a lowering of the auxiliary valve 23 within the passageway 10, this lowering being effectuated by the cooperation of the threaded stem 22 and recess 28, particularly inasmuch as the auxiliary valve is held against rotation by the ribs 24 slidably movable within the guide recesses 25.

The position of the auxiliary valve 23 will, of course, determine the amount of water flowing through the outlet 7. Hence, when two such compound valve structures are employed in adjacent relationship, one for hot and one for cold water, and both outlet pipes, such as the conduit 7, are connected by a mixer, it is apparent that a control of the temperature of the water flowing through the mixer can thus be effectuated, the position of the auxiliary valves in the hot and cold water valves determining the flow of hot and cold water, respectively.

Once the knobs 29 on the hot and cold water faucets are set for a particular temperature in the mixer, no further regulations or settings need be effected. All that is required is that the main valve handles 19 be turned on to their open position, and water of required temperature will enter the mixer. Should intermittent use of water be required, such as in the case of shaving, the main valve handles 19 are merely turned off when the water is not required and then turned on when it is required, and the desired temperature will in each case be attained.

Repeated resettings for predetermined temperatures can readily be effected by noting the position of each pointer 30 with respect to the markings 32 on surface 31, and setting the knobs 29 accordingly.

It is of course understood that the embodiment above-described and shown in the drawing is illustrative of my invention and is not employed by way of limitation, inasmuch as numerous changes and modifications may be made therein within the scope of the appended claims without departing from the spirit of this invention.

What I claim is:

1. In a valve structure, a casing containing an inlet and an outlet aperture, a hollow main valve member rotatably movable within said casing and containing a passageway adapted to communicate with both of said apertures when the member is in its predetermined open position, said member containing an axially disposed hollow valve stem, a handle operatively connected to said stem, an auxiliary valve member disposed within said main member and movable with respect thereto and in intersecting relation to said passageway, an auxiliary valve stem in threaded engagement with said auxiliary valve and extending through said hollow valve stem, whereby a rotative manipulation of said auxiliary valve stem will cause an operative movement of said auxiliary valve member with respect to said passageway and thereby effect varying degrees of obstruction thereof, longitudinally disposed extensions and recesses operatively associated with said main and auxiliary valve members to hold the auxiliary member against rotation with respect to the main member, and a valve seat on the main valve member above the passageway thereof operatively engageable with an intermediate portion of the auxiliary member when in its maximum projected position.

2. In a valve structure, a casing containing an inlet and an outlet aperture, a hollow main valve member rotatably movable within said casing and containing a passageway adapted to communicate with both of said apertures when the member is in its predetermined open position, said member containing an axially disposed hollow valve stem, a handle operatively connected to said stem, an auxiliary valve member disposed within said main member and movable with respect thereto and in intersecting relation to said passageway, an auxiliary valve stem in threaded engagement with said auxiliary valve and extending through said hollow valve stem, whereby a rotative manipulation of said auxiliary valve stem will cause an operative movement of said auxiliary valve member with respect to said passageway and thereby effect varying degrees of obstruction thereof, means to hold said auxiliary valve member against rotation with respect to the main valve member, the auxiliary member containing an expanded portion disposed intermediate the passageway and the hollow stem of the main member, and a valve seat on the main member for operatively receiving the adjacent wall of said expanded portion when the auxiliary valve member is in its maximum projected position.

3. In a valve structure, a casing containing an inlet and an outlet aperture, a hollow main valve member rotatably movable within said casing and containing a passageway adapted to communicate with both of said apertures when the member is in its predetermined open position, said member containing an axially disposed hollow valve stem, a handle operatively connected to said stem, an auxiliary valve member disposed within said main member and movable with respect thereto and in intersecting relation to said passageway, an auxiliary valve stem in threaded engagement with said auxiliary valve and extending through said hollow valve stem, whereby a rotative manipulation of said auxiliary valve stem will cause an operative movement of said auxiliary valve member with respect to said passageway and thereby effect varying degrees of obstruction thereof, means to hold said auxiliary valve member against rotation with respect to the main valve member, said main valve member comprising two detachably secured portions holding therebetween packing means in operative engagement with said auxiliary member.

4. In a valve structure, a casing containing an inlet and an outlet aperture, a hollow main valve member operatively movable within said casing between obstructing and non-obstructing positions relative to said apertures, said member containing an axially disposed hollow valve stem, a handle operatively connected to said stem, an auxiliary valve member disposed within said main member and movable with respect thereto between obstructing and non-obstructing positions relative to said apertures, an auxiliary valve stem in threaded engagement with said auxiliary valve and extending through said hollow valve stem, whereby a rotative manipulation of said auxiliary valve stem will cause an operative movement of said auxiliary valve member, the auxiliary member containing an expanded portion intermediate the extent thereof, and a valve seat on the main member for operatively receiving the adjacent wall of said expanded portion when the auxiliary valve member is in its maximum projected position.

EDMOND OJALVO.